(12) United States Patent
Hori et al.

(10) Patent No.: US 7,156,473 B2
(45) Date of Patent: Jan. 2, 2007

(54) ELASTIC TRACK SHOE

(75) Inventors: Kazutoshi Hori, Komatsu (JP); Hiroaki Watanabe, Komatsu (JP)

(73) Assignee: Komatsu Ltd., Tokyo (JP)

( * ) Notice: Subject to any disclaimer, the term of this patent is extended or adjusted under 35 U.S.C. 154(b) by 43 days.

(21) Appl. No.: 10/499,163

(22) PCT Filed: Dec. 9, 2002

(86) PCT No.: PCT/JP02/12881

§ 371 (c)(1),
(2), (4) Date: Jun. 15, 2004

(87) PCT Pub. No.: WO03/051706

PCT Pub. Date: Jun. 26, 2003

(65) Prior Publication Data

US 2005/0104448 A1    May 19, 2005

(30) Foreign Application Priority Data

Dec. 17, 2001 (JP) .............................. 2001-383307

(51) Int. Cl.
*B62D 55/26* (2006.01)
(52) U.S. Cl. ....................................... 305/187; 305/51
(58) Field of Classification Search ................ 305/46, 305/51, 185, 187, 189, 191
See application file for complete search history.

(56) References Cited

U.S. PATENT DOCUMENTS

| | | | | |
|---|---|---|---|---|
| 2,329,582 A | * | 9/1943 | Bishop | ......................... 305/183 |
| 2,536,064 A | * | 1/1951 | Knox | ........................... 305/59 |
| 2,686,697 A | * | 8/1954 | Baker | .......................... 305/161 |
| 3,058,783 A | * | 10/1962 | Wadsworth et al. | ........... 305/51 |
| 3,231,316 A | * | 1/1966 | Ruf | ............................. 305/162 |
| 3,475,060 A | * | 10/1969 | Kaifesh | ....................... 305/111 |
| 4,448,459 A | * | 5/1984 | Kortering et al. | ............ 305/162 |
| 5,255,964 A | * | 10/1993 | Hara | ............................ 305/46 |
| RE36,025 E | * | 1/1999 | Suzuki | ........................ 305/187 |
| 6,039,405 A | * | 3/2000 | Kurata et al. | .................. 301/43 |
| 6,213,573 B1 | * | 4/2001 | Nakayama | .................... 305/51 |
| 6,478,389 B1 | * | 11/2002 | Doyle | ......................... 305/187 |

FOREIGN PATENT DOCUMENTS

| | | |
|---|---|---|
| JP | 64-41483 U | 3/1989 |
| JP | 4-565592 U | 5/1992 |
| JP | 07-291159 A | 11/1995 |
| JP | 08-183485 A | 7/1996 |
| JP | 10-016835 A | 1/1998 |
| JP | 2595443 Y2 | 3/1999 |
| JP | 11-286284 A | 10/1999 |
| JP | 2000-272558 A | 10/2000 |
| JP | 2606785 Y2 | 10/2000 |
| JP | 2000-313373 A | 11/2000 |

* cited by examiner

*Primary Examiner*—Russell D. Stormer
(74) *Attorney, Agent, or Firm*—Frishauf, Holtz, Goodman & Chick, P.C.

(57) ABSTRACT

An elastic track shoe is provided wherein loosening of bolts is prevented by use of a rigid core bar and the thickness of an elastic body subjected to a load can be increased irrespective of grousers. To this end, the core bar is integrally formed by casting, forging or precutting, a ground engaging side of the core bar is covered with the elastic body, and a portion of the core bar defined by projection of a ground engaging face of the elastic body is divided into two parts.

19 Claims, 10 Drawing Sheets

(a)

(b)

(c)

(a)

(b)

(a)

(b)

(a)

(b)

(a)

(b)

(a)

(b)

ELASTIC TRACK SHOE

This application is a U.S. National Phase Application under 35 USC 371 of International Application PCT/JP02/12881 filed Dec. 9, 2002.

TECHNICAL FIELD

The present invention relates to an elastic track shoe mounted on the ground engaging side of an iron shoe plate incorporated in a crawler track of a track-type vehicle.

BACKGROUND ART

Typical crawler tracks for track-type vehicles such as bulldozers and hydraulic shovels are structured such that iron shoe plates having grousers on their ground engaging side are endlessly coupled by a number of links. Crawler tracks of this type cause serious damage to the road surface when traveling on a paved road and therefore, the ground engaging side of each iron shoe plate is provided with a protective track shoe (elastic track shoe) made from an elastic material such as rubber.

One example of conventional elastic shoes has been disclosed in Japanese Utility Model No. 2595443 according to which a metal plate is corrugated so as to conform to the irregular shape of the tread of an iron shoe plate and a rubber pad is bonded by vulcanization to the ground engaging side of the metal plate. Another example has been disclosed in Japanese Utility Model No. 2606785. The elastic track shoe of this utility model is designed such that a planar metal plate is attached only to the convex surface of an irregular-shaped elastic shoe member with mounting bolts whose leading ends project toward a side opposite to the ground engaging side (this side is hereinafter referred to as "non ground engaging side"). Japanese Kokai Patent Publication No. 10-16835 discloses another track shoe in which substantially U-shaped mounting brackets are integrally formed with the non ground engaging side of a planar plate so as to be inserted in the recesses of the shoe plate and the mounting brackets have bolt holes corresponding to the mounting holes of the shoe plate.

The track shoes disclosed in Japanese Utility Model Nos. 2595443 and 2606785 have the problem that since they are designed to have fastening members such as bolts welded to the core bar made from sheet metal, sufficient rigidity cannot be ensured, so that loosening and coming-off of the bolts are likely to occur resulting from occurrence of deflection and distortion. On the other hand, the track shoe disclosed in Japanese Patent Kokai Publication No. 10-16835, which is joined to the shoe plate through the mounting brackets, can attain improved mounting strength, but has revealed such a disadvantage that the thickness of the elastic body subjected to a load cannot be increased. This leads to strain concentration upon the elastic body, resulting in poor durability.

The present invention is directed to overcoming the foregoing problems and a primary object of the invention is therefore to provide an elastic track shoe in which loosening of the bolts is prevented by use of a rigid core bar and the thickness of the elastic body subjected to a load is increased irrespective of the grousers to improve the durability of the track shoe.

DISCLOSURE OF THE INVENTION

The above object can be accomplished by an elastic track shoe according to the invention which is mounted on a ground engaging side of an iron shoe plate incorporated in a crawler track,
wherein a core bar is integrally formed by casting, forging or precutting, at least a ground engaging side of the core bar is covered with an elastic body, and a portion of the core bar defined by projection of a ground face of the elastic body is divided into two parts.

According to the invention, since the core bar is integrally formed by casting, forging or precutting, the rigidity of the track shoe can be remarkably improved compared to track shoes made from plate metal and loosening and coming-off of the bolts can be prevented without fail. In addition, since the portion of the core bar, which is defined by projection of the ground engaging face of the elastic body, is divided into two parts, the thickness of the elastic body subjected to a load can be increased irrespective of the grousers and the volume of the whole elastic body can be increased. As a result, the cutting resistance of the elastic body and the durability of the track shoe as a whole can be improved.

In the invention, the core bar is preferably constituted by two core bar portions and each core bar portion has, at both longitudinal ends, a boss having a female threaded portion used for bolting the core bar portion to the shoe plate. With this arrangement, strain concentration can be alleviated and more improved durability can be achieved, compared to the prior art track shoe having bolt heads located at the joint between the core bar and the elastic body.

The two core bar portions may be coupled to each other at positions other than the portion defined by projection of the ground engaging face of the elastic body. With this arrangement, the rigidity of the elastic track shoe can be further improved so that the track shoe can be suitably used for a vehicle subjected to a heavy load.

Preferably, the elastic track shoe of the invention is designed such that when the track shoe is mounted on the shoe plate, the core bar gets into the space defined by adjacent grousers of the shoe plate. This makes it possible to increase the thickness of the area of the elastic body where the core bar lies.

Preferably, in the invention, the ground engaging side of the core bar is a planar surface. This alleviates strain concentration upon the elastic body, which entails improved durability. In addition, the elastic body can be easily peeled from the surface of the core bar at the time of disposal of the elastic track shoe, which facilitates reuse of the core bar.

The planar surface may be formed in an area between the bosses located at the longitudinal ends of the core bar. This alleviates strain concentration upon the longitudinal center of the elastic body that is mainly subjected to a load.

Preferably, the height of the planar surface constituting the ground engaging side of the core bar is substantially equal to the height of the grousers of the shoe plate when the track shoe is mounted on the shoe plate. With this arrangement, the surface of an area of the elastic body intermediate between the two core bar portions comes into contact with a grouser so that the track shoe will not be damaged by the corners of the grouser.

Preferably, in the invention, a clearance is formed between the non ground engaging face of the area of the elastic body intermediate between the two core bar portions and the leading end face of the grouser of the shoe plate, the leading end face being opposed to the non ground engaging face of the area. With this arrangement, the surface of the area of the elastic body located between the two core bar portions can be protected from damage caused by the grouser.

Preferably, a groove is provided on the ground engaging face of the area of the elastic body intermediate between the two core bar portions. This reduces the load imposed on the grousers.

The clearance is preferably closed up with the elastic body at both longitudinal ends of each core bar portion and the non ground engaging side of the elastic body in the closed area has the shape of a tapered face inclining outwardly from the inside of the clearance. This prevents penetration of earth and sand into the clearance formed between the elastic body and the grouser in the area between the two core bar portions. In addition, thanks to the formation of the tapered face on the elastic body, water or the like which has come into the clearance can be ejected outwardly from the clearance when the elastic body bows. By setting the mounting position of the elastic track shoe such that the leading end of the tapered face is compressed when the elastic track shoe is mounted, the effect of sealing to prevent the penetration of earth and sand can be further improved.

In the invention, it is preferable to form the core bar such that its longitudinal ends bend toward the non ground engaging side. With this arrangement, if the elastic track shoe runs on a rock or the like, the rock can escape, slipping through the bent ends of the elastic body. Even if the rock or the like is firmly caught so that it cannot escape, the load can be sustained by the bent surface and as a result, local stress concentration on the elastic body can be avoided, thereby preventing cutting of the ear of the elastic body.

In the invention, it is preferable to integrally form supports or ribs with the core bar on its non ground engaging side. This makes it possible to transmit the load received from the ground to the shoe plate without fail, while the weight of the core bar can be reduced.

It is preferable to form elastic body projections at the longitudinal center of the non ground engaging face of the elastic body, the elastic body projections being insertable into through holes defined in the shoe plate. With this arrangement, earth and sand can be prevented from penetrating into the space between the shoe plate and the elastic track shoe by way of the through holes defined in the shoe plate. Even if earth and sand or snow existing on the road penetrates into the space enclosed by the right/left crawler track links and front/rear connecting pins and is compacted by the sprockets or the like, the elastic projections squeezed at the time of the compaction will expand and restore to their original state due to their restoring force in the area deflecting from the sprockets or the like. As a result, the phenomenon in which earth, sand, snow and others which have got into the space between the crawler track links are packed can be avoided without fail.

In another preferred embodiment, the non ground engaging side of the core bar is also covered with the elastic body and the core bar has a plurality of holes. Through these holes, an elastic body portion on the ground engaging side and an elastic body portion on the non ground engaging side can be integrally formed. With this arrangement, a resinous or elastic body having insufficient adhesion to the core bar can be used for the elastic track shoe of the invention.

In the invention, a cable layer may be embedded in the elastic body so as to bestride the two core bar portions. With this arrangement, the two core bar portions can be integrated by reinforcement by the cable layer and the area of the elastic body intermediate between the core bar portions can be prevented from being damaged by the grousers. The direction in which the cable layer is embedded may be the longitudinal, widthwise or diagonal direction of the elastic track shoe. In addition, the cable layer may be a single or double layer.

On the front and rear faces of the core bar at its longitudinal ends, a projection may be formed which is brought into contact with the tip of the grouser of the shoe plate. The front and rear faces of the core bar excluding the projections are covered with the elastic body. With this arrangement, since the areas of the front and rear faces where exclude the projections are covered with the elastic body, the elastic body is unlikely to peel from the core bar.

It is preferable to provide the elastic body with grooves located in the neighborhood of a joint between the core bar and the elastic body. With this arrangement, the grooves are deformed when a load is imposed on the elastic body so that strain concentration can be avoided to prevent the peeling of the elastic body from the core bar.

Preferably, the elastic body is comprised of a plurality of layers having different hardnesses and a layer closer to the core bar is harder. This prevents occurrence of strain concentration on the joint between the core bar and the elastic body so that the durability of the joint can be improved. In addition, since a portion of the elastic body in the vicinity of the tread is soft, a friction coefficient with respect to the road surface can be ensured.

BEST MODE FOR CARRYING OUT THE INVENTION

Referring now to the accompanying drawings, elastic track shoes will be concretely described according to preferred embodiments of the invention.

Figure 1:
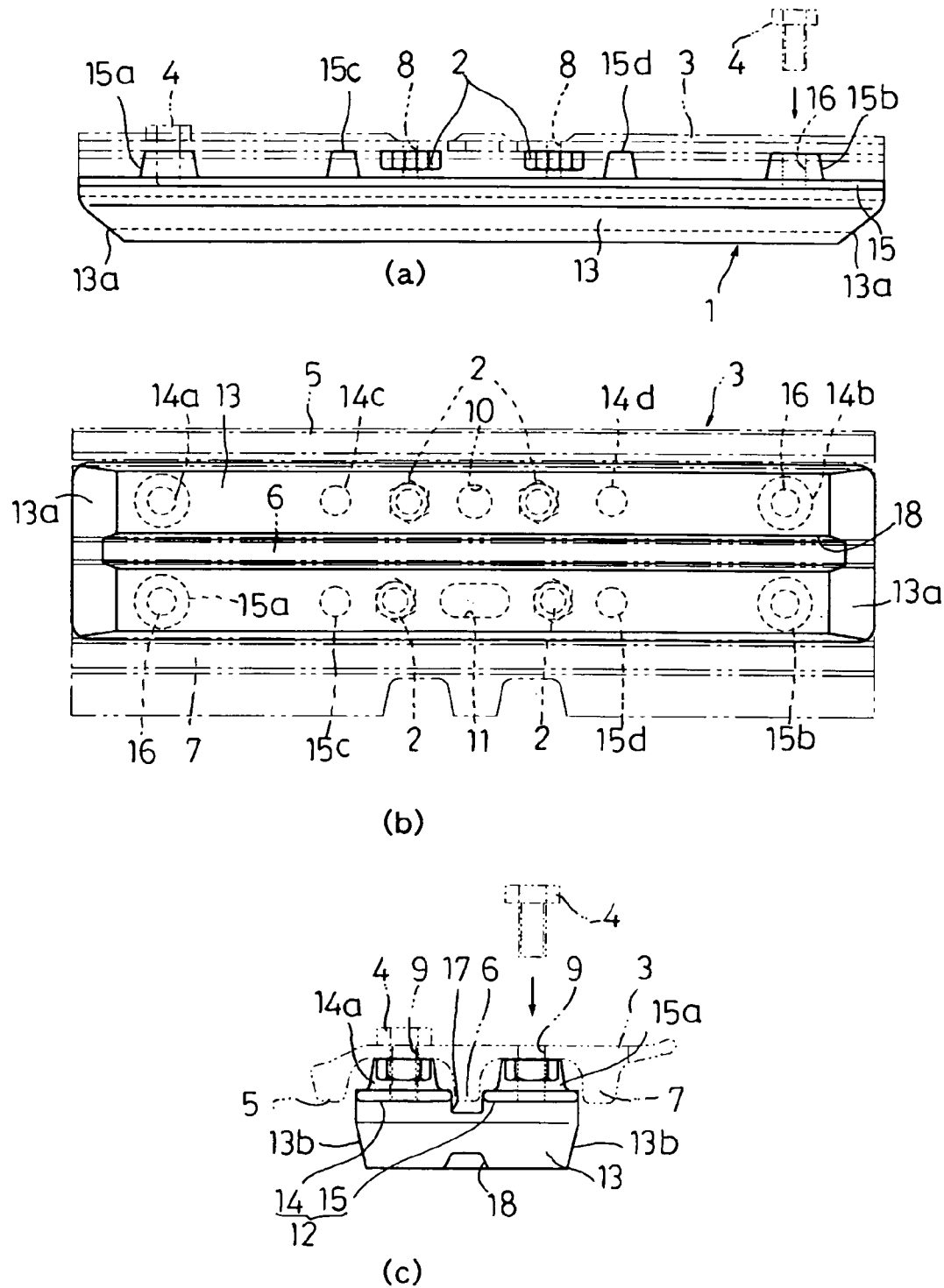
FIGS. 1(a), 1(b) and 1(c) are a front view, bottom view and side view, respectively, of an elastic track shoe constructed according to a first embodiment of the invention.

FIGS. 1(a), 1(b) and 1(c) are a front view, bottom view and side view, respectively, of an elastic track shoe constructed according to a first embodiment of the invention.

An elastic track shoe 1 according to the first embodiment is attached to the ground engaging side of an iron shoe plate 3 by means of a plurality of bolts 4 (four bolts in the first embodiment), the shoe plate 3 being mounted to a crawler track link (not shown) with a plurality of bolts 2 (four bolts in the first embodiment) and nuts (not shown).

The shoe plate 3 has three grousers 5, 6, 7 in total, which are located at the widthwise center and widthwise ends of the shoe plate 3, extending in a longitudinal direction of its tread. The shoe plate 3 has, at its longitudinal center, bolt insertion holes 8 through which the bolts 2 pass in order to attach the shoe plate 3 to a crawler track link. Provided at positions close to both longitudinal ends are bolt insertion holes 9 through which the bolts 4 pass in order to attach a core bar 12 of the elastic track shoe 1 to the shoe plate 3. The shoe plate 3 has two through holes, that is, a circular through hole 10 and a substantially elliptical through hole 11 in the area surrounded by the four bolt insertion holes 8 (the through holes are not limited to the above shapes but may be rectangular and the number of through holes may be one or three or more).

The elastic track shoe 1 includes an elastic body 13 that is made from rubber or the like and bonded to the core bar 12 so as to cover it. The core bar 12 is divided into two parts, namely, core bar portions 14, 15 that are spaced apart at a specified distance in a widthwise direction of the elastic track shoe 1, being parallel with each other. The ground engaging side of each core bar portion 14 (15) is a planar surface. On the side opposite to the ground engaging side (hereinafter referred to as "non ground engaging side") of the core bar portion 14 (15), substantially frustum cone shaped supports (bosses) 14a, 14b; 15a, 15b having a large diameter are integrally formed at both longitudinal ends, and substantially frustum cone shaped supports 14c, 14d; 15c, 15d having a small diameter are integrally formed at intermediate positions each of which is situated between a longitudinal end and the longitudinal center. Each of the supports 14a, 14b; 15a, 15b formed at both longitudinal ends has a female threaded part 16 into which the bolt 4 is screwed. The female threaded parts 16 extend until they pass through the main body of the core bar 12 having a planar surface. The core bar 12 is integrally formed by casting, forging or precutting a material having high rigidity so that it is not deformed even if the weight of the vehicle is imposed thereon. For the core bar 12, ordinary core bar materials such as steel, cast steel and cast iron may be used. In addition to these materials, examples of the material of the core bar 12 include metallic composite materials and non-metallic composite materials.

The elastic body 13 is made from a relatively soft material such as rubber, urethane, resin, elastomer, and non-metallic composite material. Where the elastic body 13 is made from rubber for instance, the ordinary vulcanization bonding method is employed for bonding the elastic body 13 to the core bar 12. The elastic body 13 has inclined faces 13a at its front/rear sides and inclined faces 13b at its ends. The inclined faces 13a, 13b are inclined at a specified angle such that the width and length of the ground engaging face of the elastic body 13 are shorter than the width and length of the non ground engaging face, respectively.

In the elastic body 13, a groove 17 is formed in the area between the core bar portions 14, 15 on the non ground engaging side of the elastic body 13. On the ground engaging side of the elastic body 13, a groove 18 is formed at the position opposed to the groove 17. This arrangement is made with a view to reducing stress concentration upon the leading ends of the grousers 6. The central grouser 6 of the shoe plate 3 gets into the space between the core bar portions 14, 15 and at that time, a clearance is formed between the leading end face of the central grouser 6 and the surface of the groove 17. The height of each grouser 5 (6, 7) is substantially equal to the height of the planar surface of the ground engaging side of the core bar 12. In this way, the surface of the elastic body 13 located between the core bar portions 14, 15 can be prevented from being damaged by the grouser 6. In addition, stress concentration upon the leading end of the grouser 6 can be reduced.

The core bar 12 of the elastic track shoe 1 having such a structure has remarkably improved rigidity, compared to core bars made from plate metal. In addition, since the bolts 4 are screwed into the female threaded parts 16 of the bosses 14a, 14b; 15a, 15b, the bolts can be prevented from being loosened or coming off without fail. By virtue of the two-part type core bar 12, the thickness of the elastic body subjected to a load can be increased irrespective of the grousers so that improved durability can be achieved. Further, since the ground engaging side of the core bar is a planar surface, less strain concentration upon the elastic body occurs, which also contributes to an improvement in the durability. Further, there is such an advantage that the elastic body can be easily peeled off at the time of disposal of the elastic track shoe and therefore reuse of the core bar is facilitated.

Figure 2:
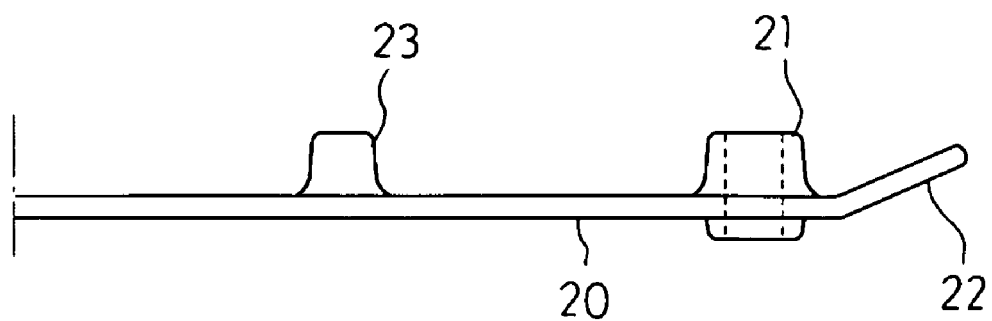
FIG. 2 is a partial sectional view of a core bar of an elastic track shoe constructed according to a second embodiment of the invention.

FIG. 2 is a partial sectional view of a core bar of an elastic track shoe constructed according to a second embodiment of the invention.

The elastic track shoe of the second embodiment is the same as that of the first embodiment except the shape of the core bar. In the second embodiment, a support (boss) 21 is disposed at both longitudinal ends of each core bar portion 20 so as to somewhat project toward the ground engaging side of the core bar portion 20, and the ground engaging side of the area intermediate between the bosses 21 located at both ends is made in the form of a planar surface. The structure of this embodiment is useful particularly for the case where sufficient screw depth is required for the bolts 4 (See FIG. 1) used for attaching the core bar to the shoe plate.

In the second embodiment, each core bar portion 20 bends to the non ground engaging side at the longitudinal ends thereof, thereby forming inclined faces 22. The provision of the inclined faces 22 offers such an advantage that if the elastic track shoe runs on a rock or the like, the rock can escape by way of an end of the elastic body which is formed so as to extend along a inclined face 22. Even if the rock or the like is firmly caught so that it cannot escape, the load can be sustained by the bent face. As a result, local stress concentration upon the elastic body can be avoided, thereby preventing cutting of an ear of the elastic body. In FIG. 2, reference numeral 23 designates a support for reinforcement that is similar to the supports 14c, 14d; 15c, 15d of the first embodiment.

Figure 3:
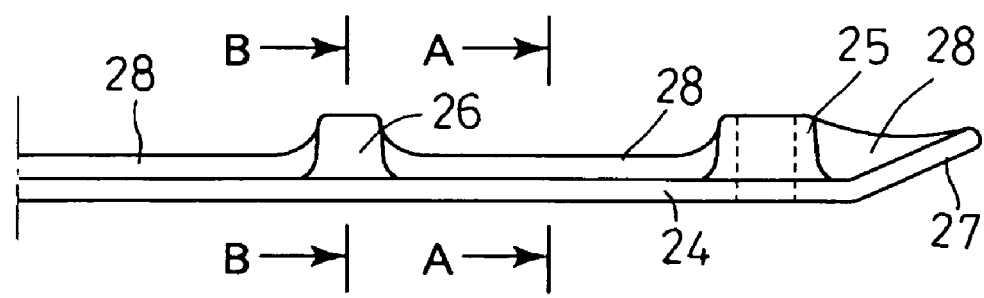
FIG. 3(a) is a partial front view of a core bar of an elastic track shoe constructed according to a third embodiment of the invention.
FIG. 3(b) is a sectional view taken along line A—A of FIG. 3(a)
FIG. 3(c) is a sectional view taken along line B—B of FIG. 3(a).
Figure 3:
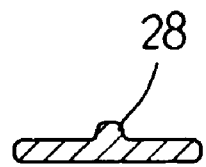
Figure 3:
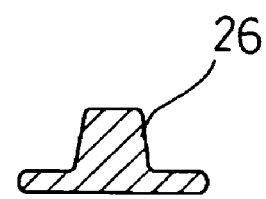

FIG. 3(a) is a partial front view of a core bar of an elastic track shoe constructed according to a third embodiment of the invention, FIG. 3(b) is a sectional view taken along line A—A of FIG. 3(a), and FIG. 3(c) is a sectional view taken along line B—B of FIG. 3(a).

The elastic track shoe of the third embodiment is similar to that of the first embodiment except the shape of the cross bar. In the third embodiment, a support 25 is formed at an end of each core bar portion 24 and another support 26 is formed at the middle part of the core bar portion 24. Provided between the supports 25 and 26 and between the support 25 and the leading end of the inclined face 27 are ribs 28. The provision of the ribs 28 allows the load received from the ground surface to be transmitted to the shoe plate without fail and also contributes to a reduction in the weight of the core bar.

FIG. 4(a) is a partial bottom view of a core bar of an elastic track shoe constructed according to a fourth embodiment of the invention.

Figure 4:
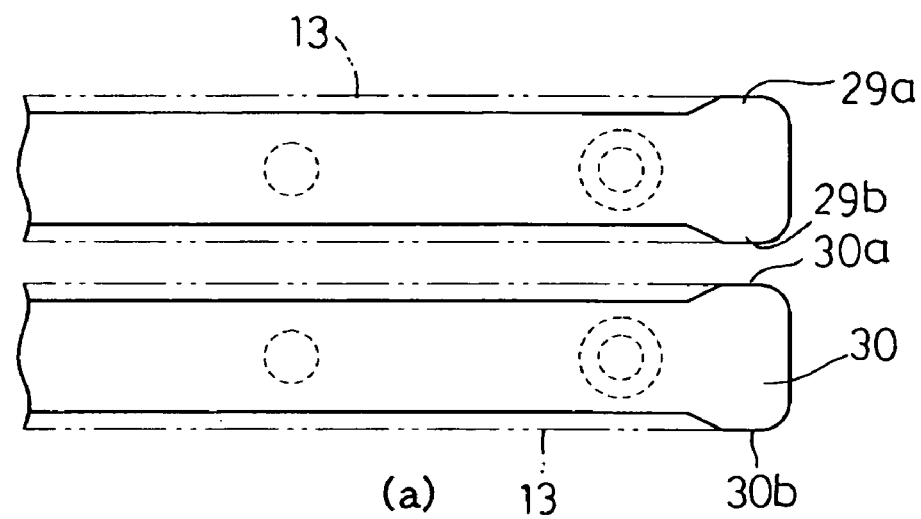
FIG. 4(a) is a partial bottom view of a core bar of an elastic track shoe constructed according to a fourth embodiment of the invention.
FIG. 4(b) is a partial bottom view of a modification of it.
Figure 4:
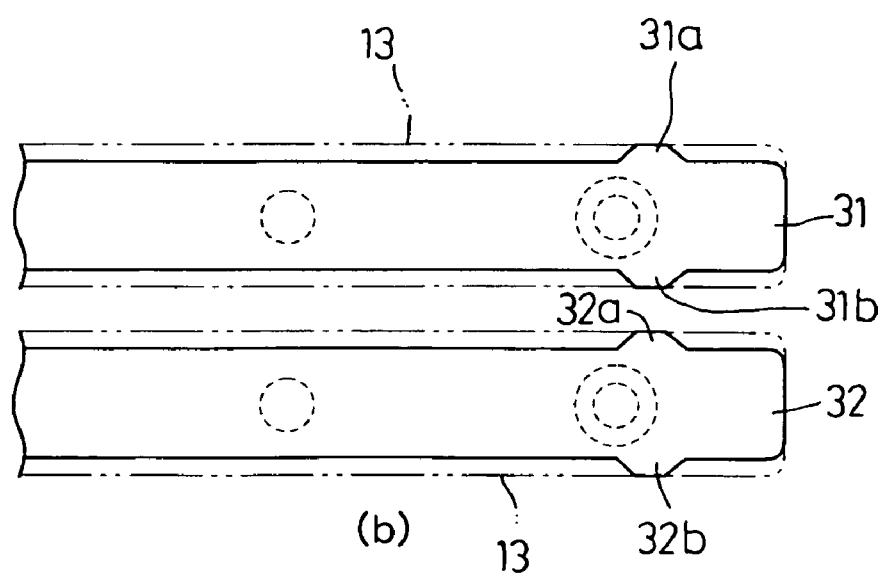

The elastic track shoe of the fourth embodiment is similar to that of the first or second embodiment except the shape of the cross bar. In the fourth embodiment, there are provided projections 29a, 29b (30a, 30b) on the front and rear faces of each core bar portion 29 (30) at both ends thereof (FIG. 4 shows only one end). These projections are brought into contact with the leading ends of the grousers 5, 6, 7 of the shoe plate 3 (See FIG. 1(c)). The front and rear faces of the core bar portions except the projections 29a, 29b; 30a, 30b are covered with the elastic body 13.

In the elastic track shoe of such a structure, since the projections 29a, 29b; 30a, 30b are brought into contact with the grousers 5, 6, 7, damage to the elastic body 13 caused by a direct contact between the grousers 5, 6, 7 and the elastic body 13 can be prevented. Moreover, since the front and rear faces of the core bar portions 29, 30 excluding the projections 29a, 29b; 30a, 30b are covered with the elastic body 13, peeling of the elastic body 13 from the core bar portions 29, 30 is unlikely to occur.

FIG. 4(b) shows a modification of the fourth embodiment. In contrast with the embodiment shown in FIG. 4(a), projections 31a, 31b (32a, 32b) are formed slightly closer to the center of each core bar portion 31 (32). In this case, the front and rear faces of the core bar portions 31, 32 excluding the projections 31a, 31b; 32a, 32b are covered with the elastic body 13. This structure also has the same effect and function as those of the fourth embodiment.

Figure 5:
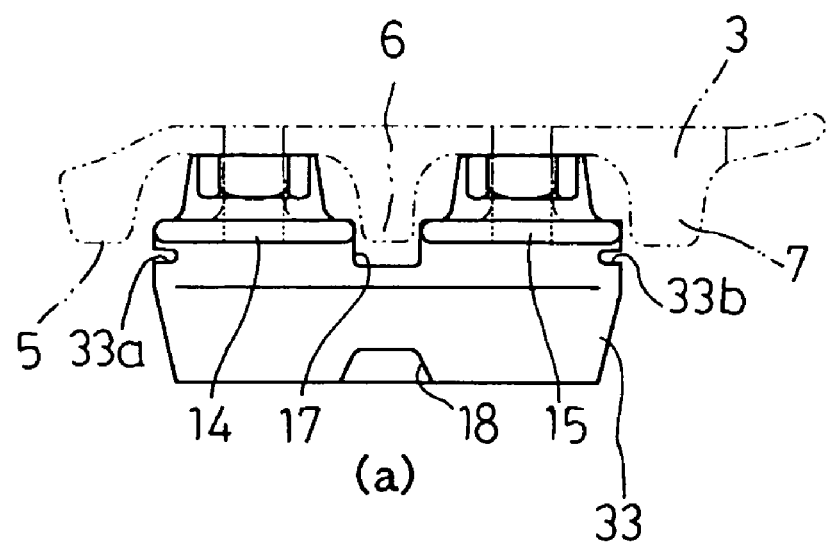
FIG. 5(a) is a side view of an elastic track shoe constructed according to a fifth embodiment of the invention.
FIG. 5(b) is a side view of a modification of it.
Figure 5:
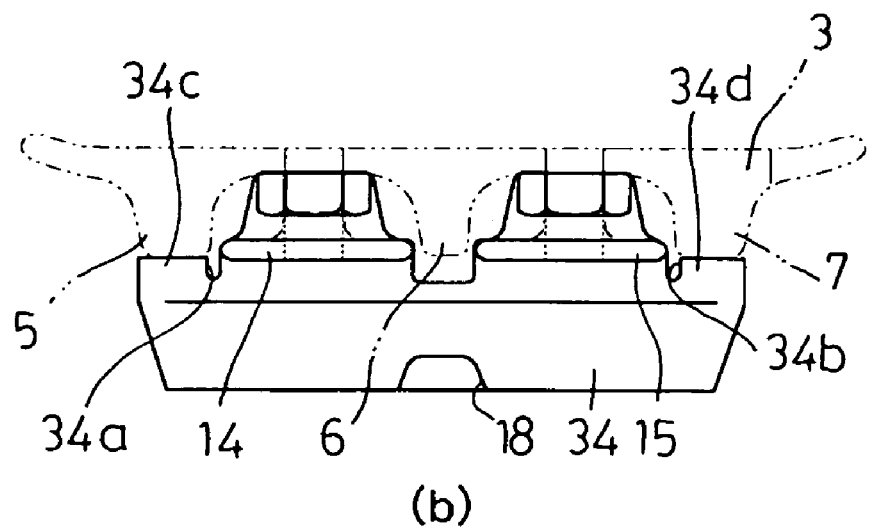

FIG. 5(a) is a side view of an elastic track shoe constructed according to a fifth embodiment of the invention.

Basically, the elastic track shoe of the fifth embodiment does not differ from that of the first embodiment except the shape of the elastic body 33. Therefore, in the fifth embodiment, the parts similar to those of the first embodiment are designated by the same reference numerals as of the first embodiment and a detailed explanation of them is skipped.

In the fifth embodiment, cross-sectionally U-shaped grooves 33a, 33b are formed along the longitudinal direction of the elastic body 33 in the vicinity of the joint between the core bar portions 14, 15 and the elastic body 33 on the front and rear faces of the elastic body 33. The provision of the grooves 33a, 33b has such an effect that when a load is imposed on the elastic body 33, the grooves 33a, 33b are deformed, thereby avoiding strain concentration so that peeling of the elastic body 33 from the core bar portions 14, 15 can be prevented.

FIG. 5(b) shows a modification of the fifth embodiment. In this modification, the front and rear edges 34c, 34d of the elastic body 34 project more outwardly than the front edge of the core bar portion 14 and the rear edge of the core bar portion 15, and grooves 34a, 34b are formed in the elastic body 34 so as to be located between the projecting edges 34c, 34d and the side edges of the core bar portions 14, 15. The grousers 5, 7 are brought into contact with the surfaces of the projecting edges 34c, 34d on the non ground engaging side. The modification, in which the grooves 34a, 34b are formed in the above-described locations, has the same effect and function as the fifth embodiment.

FIG. 6(a) shows a bottom view of an elastic track shoe constructed according to a sixth embodiment of the invention, and FIG. 6(b) shows a sectional view taken along line C—C of FIG. 6(a).

Figure 6:
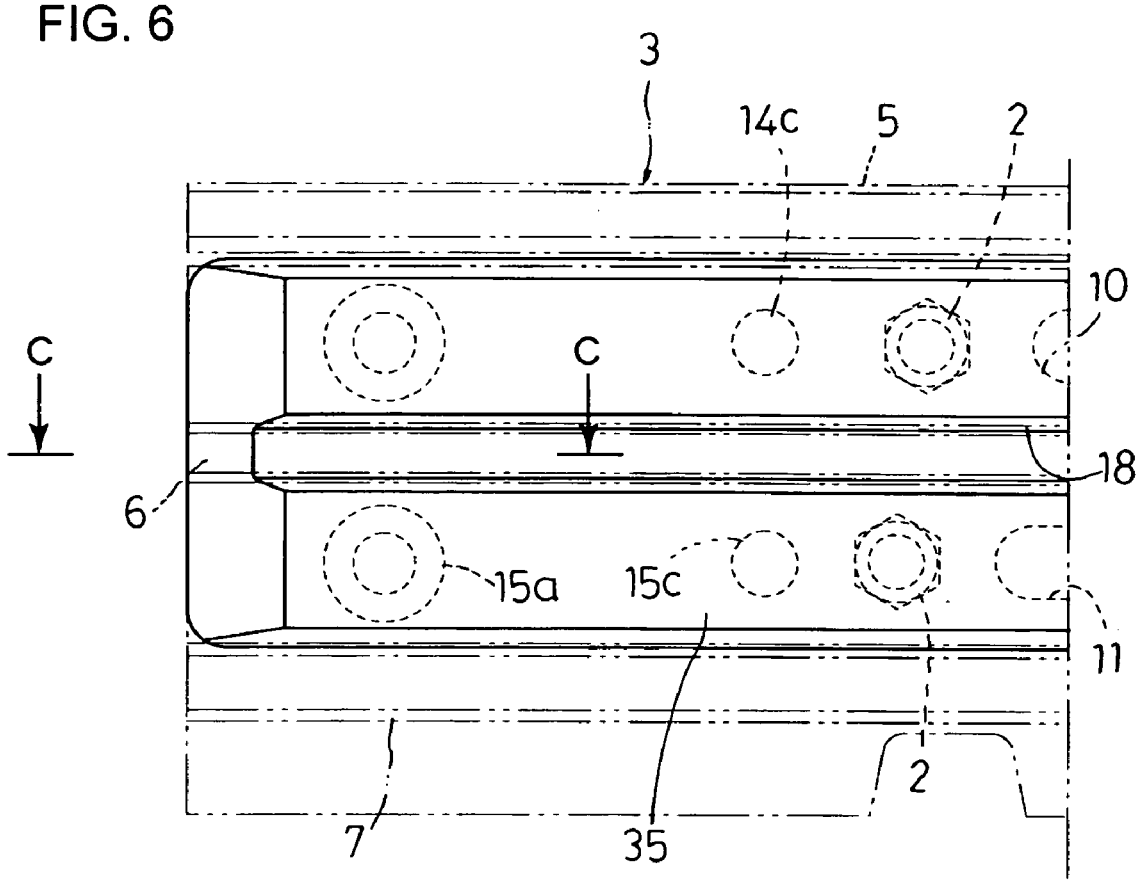
FIG. 6(a) is a bottom view of an elastic track shoe constructed according to a sixth embodiment of the invention.
FIG. 6(b) is a sectional view taken along line C—C of FIG. 6(a).
Figure 6:
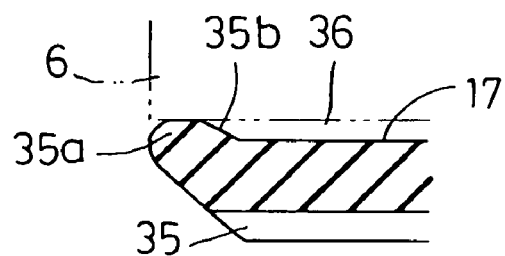

In the sixth embodiment, the parts similar to those of the first embodiment are designated by the same reference numerals as given to the first embodiment and a detailed explanation of them is skipped. In the sixth embodiment, the clearance 36 formed between the surface of the groove 17 on the non ground engaging side of the elastic body 35 and the leading end face of the grouser 6 is closed up by projecting parts 35a of the elastic body 35 at both longitudinal ends of the core bar (FIG. 6 shows only one end). On the clearance 36 side of each projecting part 35a, a tapered face 35b is formed, inclining outwardly from the inside of the clearance 36. For achieving an increased sealing effect, it is desirable to determine the mounting position of the elastic track shoe such that the leading ends of the tapered faces 35b are compressed at the time of mounting the elastic track shoe.

In the elastic track shoe of the sixth embodiment, since the clearance 36 is closed up by the projecting parts 35a at both longitudinal ends of the core bar, penetration of earth and sand into the clearance 36 from outside can be prevented. Further, the inner face of each projecting part 35a is the tapered face 35b, and therefore, if water or the like penetrates into the clearance 36, the tapered faces 35b will bow, receiving a load, which facilitates a flow of the water or the like outwardly from the clearance 36.

Figure 7:
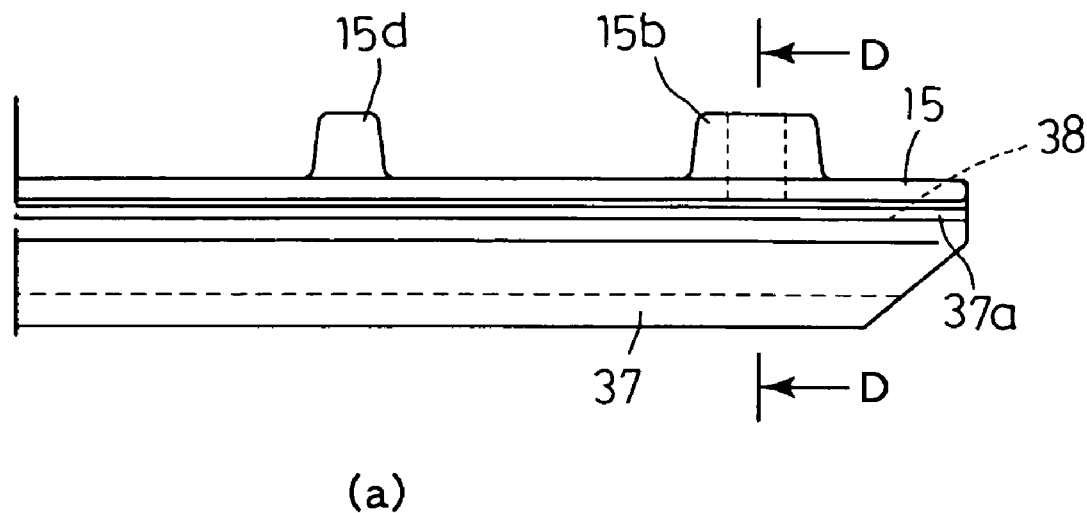
FIG. 7(a) is a front view of an elastic track shoe constructed according to a seventh embodiment of the invention.
FIG. 7(b) is a sectional view taken along line D—D of FIG. 7(a).
Figure 7:
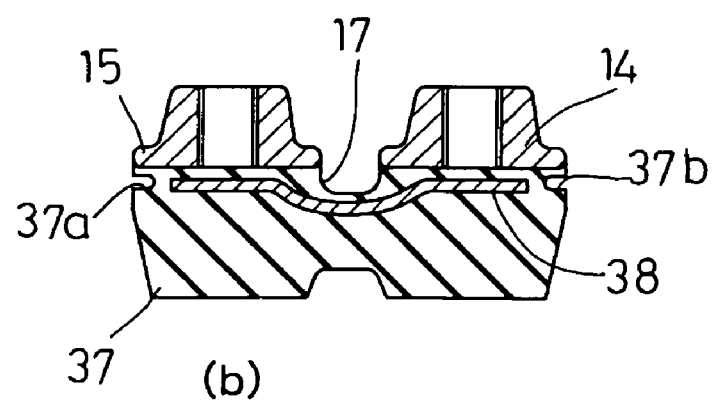

FIG. 7(a) shows a front view of an elastic track shoe constructed according to a seventh embodiment of the invention, and FIG. 7(b) shows a sectional view taken along line D—D of FIG. 7(a).

In the seventh embodiment, a cable layer 38 is embedded in an elastic body 37. The cable layer 38 bestrides the two core bar portions 14, 15 and extends throughout the elastic body 37 in the widthwise and longitudinal directions. The cable layer 38 is located under the groove 17 formed on the non ground engaging side of the elastic body 37, curving along the groove 17. In the elastic body 37 of this embodiment, grooves 37a, 37b similar to the grooves 33a, 33b of the fifth embodiment are formed.

In the elastic track shoe of the seventh embodiment, thanks to the provision of the cable layer which serves as a reinforcement, the core bar portions 14, 15 can be integrated with each other and the portion of the elastic body 37 located between the core bar portions 14, 15 can be prevented from being damaged by the grouser. The cable layer 38 also contributes to an improvement in the durability of the elastic track shoe itself.

While the cable layer 38 composed of a single layer is embedded in the elastic track shoe in a widthwise direction in the seventh embodiment, the embedding direction of the cable layer 38 may be a longitudinal direction or diagonal direction. Additionally, the cable layer 38 may be comprised of a single layer or a plurality of layers which cross each other.

Figure 8:
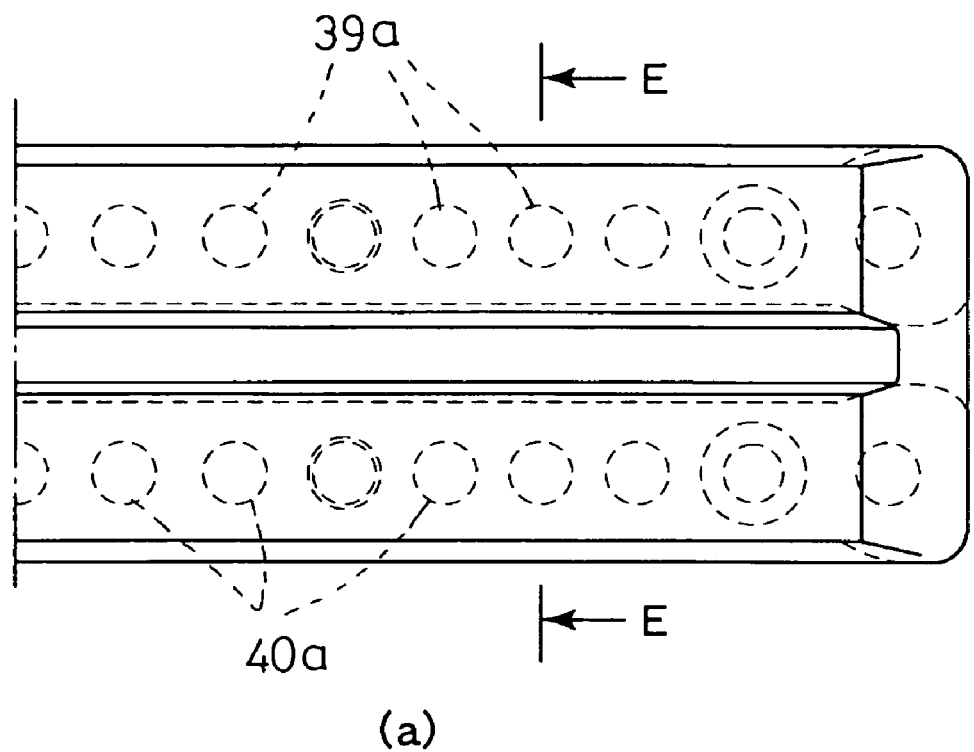
FIG. 8(a) is a bottom view of an elastic track shoe constructed according to an eighth embodiment of the invention and FIG. 8(b) is a sectional view taken along line E—E of FIG. 8(a).
Figure 8:
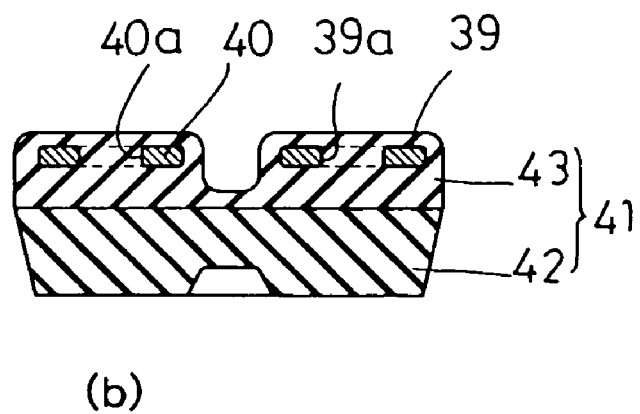

FIG. 8(a) shows a bottom view of an elastic track shoe constructed according to an eighth embodiment of the invention and FIG. 8(b) shows a sectional view taken along line E—E of FIG. 8(a).

In the elastic track shoe of the eighth embodiment, the non ground engaging side of the core bar is also covered with the elastic body. A plurality of holes 39a (40a) are formed in each of the two core bar portions 39, 40, being aligned in the longitudinal direction thereof. Through these holes 39a, 40a, the elastic body portion 41 on the ground engaging side and the elastic body portion 41 on the non ground engaging side are integrally formed. The elastic body 41 has a double layer structure, comprising an (soft) elastic body layer 42 having relatively low hardness located on the ground engaging side and an (hard) elastic body layer 43 having relatively high hardness located on the non ground engaging side.

In the elastic track shoe of the eighth embodiment, the elastic body layer 42 on the ground engaging side and the elastic body layer 43 on the non ground engaging side are integrated with each other through the plurality of holes 39a, 40a, and therefore even if a resinous or elastic material having weak adhesion to the core bar is used, the strength of bonding will not be adversely affected. In addition, since the area in the vicinity of the core bar is constituted by the hard elastic body layer 43, strain concentration upon the joint between the core bar and the elastic body can be avoided, resulting in an improvement in the durability of the joint. In addition, the area closer to the ground engaging face is constituted by the relatively soft elastic body layer 42 and therefore a friction coefficient with respect to a road surface can be ensured thereby achieving improved traveling performance.

Figure 9:
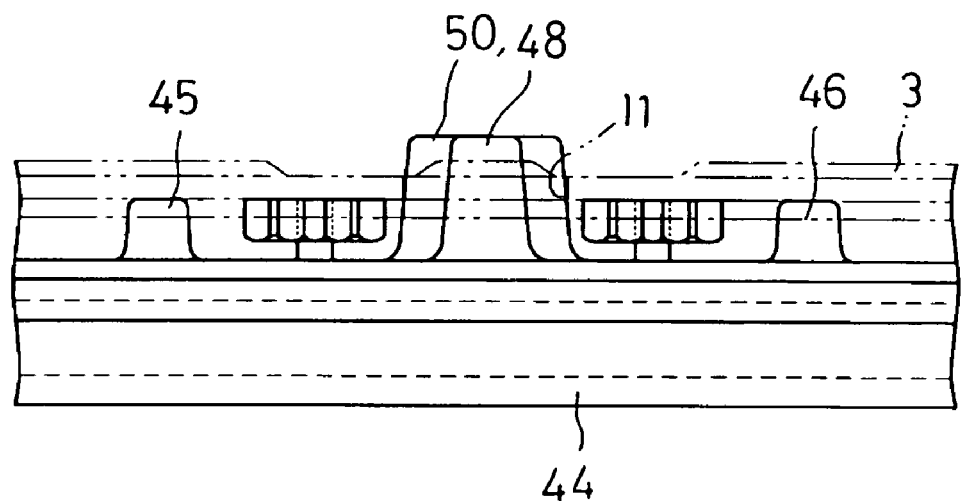
FIG. 9 is a partial front view of an elastic track shoe constructed according to a ninth embodiment of the invention.

FIG. 9 is a partial front view of an elastic track shoe constructed according to a ninth embodiment of the invention.

In the elastic track shoe of the ninth embodiment, elastic body projections 48, 50 are integrally formed intermediate between small-diameter supports 45, 46 which are provided for the elastic body 44 on its non ground engaging side. The elastic body projections 48, 50 are insertable into the through holes 10, 11 formed in the shoe plate 3.

According to the elastic track shoe of this embodiment, the through holes 10, 11 formed in the shoe plate 3 are bunged up by the elastic body projections 48, 50 and therefore penetration of earth and sand into the space between the shoe plate 3 and the elastic track shoe can be prevented without fail. Even if earth and sand or snow existing on the road surface penetrates into the space enclosed by the right/left crawler track links and the front/rear connecting pins and is compacted by the sprockets or the like, the elastic body projection 48 squeezed at the time of the compaction will expand and restore to its original state due to its restoring force in an area deflecting from the sprockets or the like, so that the earth, sand and snow which have got into the crawler track links can be eliminated at the time of the expansion of the elastic body projection 48. As a result, the packing phenomenon of the earth, sand, snow and others can be prevented without fail.

FIGS. 10(a), 10(b) and 10(c) are a front view, bottom view and side view, respectively, of an elastic track shoe constructed according to a tenth embodiment of the invention.

Figure 10:
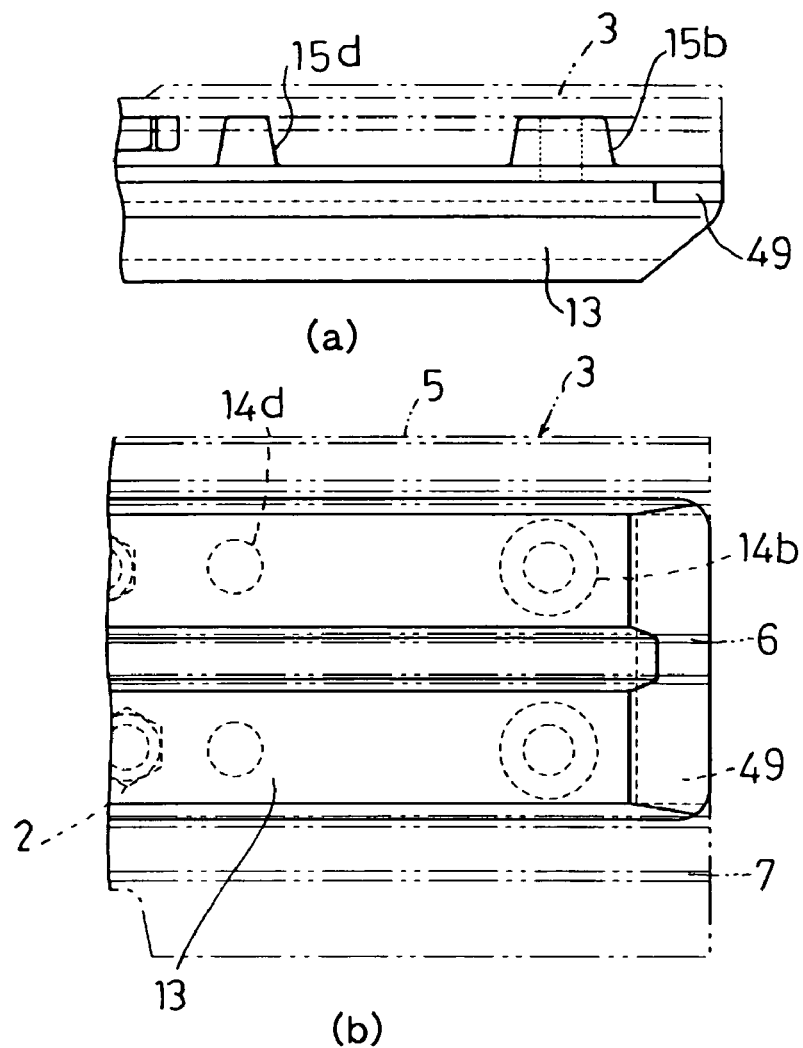
FIGS. 10(a), 10(b) and 10(c) are a front view, bottom view and side view, respectively, of an elastic track shoe constructed according to a tenth embodiment of the invention.
Figure 10:
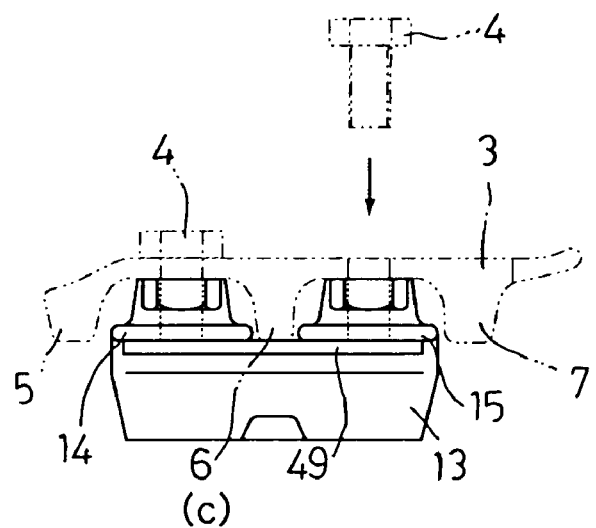

While the foregoing embodiments have been discussed with the core bar divided into two parts, the tenth embodiment is designed such that the divided core bar portions 14, 15 are coupled to each other at both ends (FIG. 10 shows only one end) by use of couplers 49. With this arrangement, the core bar portions 14, 15 are integrated at both ends so that the rigidity of the elastic track shoe can be further improved. In this way, an elastic track shoe suited for use in a vehicle that is subjected to heavy load can be obtained.

The couplers 49 may be disposed at any positions except the area defined by the projection of the ground engaging face of the elastic body 13, and the positions of the couplers 49 are not limited to the ones noted in this embodiment. The couplers 49 may be formed by integral molding at the time of formation of the core bar or may be joined to both ends of the core bar portions.

The structures of the foregoing embodiments may be employed alone or in combination. The elastic track shoes of the above embodiments are not only applicable to a wide variety of construction machines ranging from small to large size but also to track-type vehicles such as farm machines and industrial machines.

What is claimed is:

1. An elastic track shoe which is adapted to be mounted on a ground engaging side of an iron shoe plate incorporated in a crawler track, said track shoe comprising:
   a core bar which is integrally formed by casting, forging or precutting; and
   an elastic body covering a ground engaging side of the core bar;
   wherein the core bar is constituted by two core bar portions and each core bar portion has, at both longitudinal ends, a boss having a female threaded portion used for bolting the core bar portion to the shoe plate.

2. The elastic track shoe according to claim 1, wherein the two core bar portions are coupled to each other in areas other than a portion of the core bar that corresponds to a ground engaging face of the elastic body.

3. The elastic track shoe according to 1, wherein when the track shoe is mounted on the shoe plate, the core bar portions are positioned in spaces defined by adjacent grousers of the shoe plate.

4. The elastic track shoe according to 1, wherein the ground engaging side of the core bar is a planar surface.

5. The elastic track shoe according to claim 4, wherein the planar surface is formed on each of the core bar portions in an area between the bosses located at the longitudinal ends of the core bar portions.

6. The elastic track shoe according to claim 5, wherein the planar surface at the ground engaging side of the core bar is positioned at substantially a same height as grousers of the shoe plate when the track shoe is mounted on the shoe plate.

7. The elastic track shoe according to claim 4, wherein the planar surface at the ground engaging side of the core bar is positioned at substantially a same height as grousers of the shoe plate when the track shoe is mounted on the shoe plate.

8. The elastic track shoe according to claim 1, wherein a clearance is formed between a non-ground-engaging side of an area of the elastic body and a leading end face of a grouser of the shoe plate, wherein said area of the elastic body is located between the two core bar portions, and said leading end face is opposed to the non-ground-engaging side of said area.

9. The elastic track shoe according to 8, wherein a groove is provided in a ground engaging side of the elastic body at a position corresponding to the area of the elastic body between the two core bar portions.

10. The elastic track shoe according to claim 9, wherein said clearance is closed up by the elastic body at both longitudinal ends of each core bar portion, and a non-ground-engaging side of the elastic body within said closed area has a shape of a tapered face inclining outwardly from inside of the clearance.

11. The elastic track shoe according to claim 8, wherein said clearance is closed up by the elastic body at both longitudinal ends of each core bar portion, and a nonground-engaging side of the elastic body within said closed area has a shape of a tapered face inclining outwardly from inside of the clearance.

12. The elastic track shoe according to claim 1, wherein the core bar is bent away from the ground engaging side thereof at longitudinal ends thereof.

13. The elastic track shoe according to claim 1, wherein supports or ribs are integrally formed with the core bar on a non-ground-engaging side thereof.

14. The elastic track shoe according to claim 1, wherein elastic body projections are formed at a longitudinal center of a non-ground-engaging side of the elastic body, and wherein the elastic body projections are insertable through holes formed in the shoe plate that correspond respectively thereto.

15. The elastic track shoe according to claim 1, wherein a non-ground-engaging side of the core bar is also covered with the elastic body, wherein the core bar has a plurality of holes, and wherein a part of the elastic body on the ground engaging side and a part of the elastic body on the non-ground-engaging side are connected through said holes.

16. The elastic track shoe according to claim 1, wherein a cable layer is embedded in the elastic body so as to bestride the two core bar portions.

17. The elastic track shoe according to claim 1, wherein projections are formed on front and rear faces, respectively, of the core bar at longitudinal ends thereof and said front and rear faces excluding the projections are covered with the elastic body.

18. The elastic track shoe according to claim 1, wherein grooves are formed in the elastic body in a vicinity of a joint between the core bar and the elastic body.

19. The elastic track shoe according to claim 1, wherein the elastic body comprises a plurality of layers having different hardnesses, and one of the layers closer to the core bar is harder.

* * * * *